Patented Dec. 20, 1938

2,140,539

UNITED STATES PATENT OFFICE 2,140,539

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application January 23, 1937, Serial No. 122,078

11 Claims. (Cl. 8—50)

This invention relates to aromatic azo compounds. More particularly, it relates to nuclear non-sulfonated aromatic azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aromatic azo compounds can be obtained by coupling aromatic diazonium salts in an alkaline medium with compounds of the type represented by the formula:

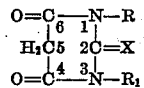

wherein X represents oxygen or sulfur, R represents hydrogen, an alkyl group, an alkaryl group, or an aryl group and $R_1$ represents an alkyl, an alkaryl or an aryl group. The alkyl and aryl substituents may be substituted or unsubstituted as will be apparent from the description hereinafter.

The compounds of our invention have the probable formula:

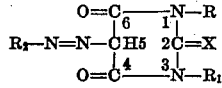

wherein X, R and $R_1$ have the meaning above given and $R_2$ is an aromatic nucleus which may be substituted or unsubstituted. Advantageously, $R_2$ is an aryl nucleus of the benzene series.

To avoid any possible ambiguity, the barbituric nucleus has been numbered as indicated above. This numbering will be followed throughout.

The azo compounds of our invention constitute a valuable class of dyes. The nuclear non-sulfonated azo compounds may be employed for the dyeing or coloration of materials made of or containing organic derivatives of cellulose. The dyeings produced employing said non-sulfonated azo compounds are, in general, of good fastness to light and washing and range in shade from greenish yellow to red. The nuclear sulfonated compounds of the invention possess less or no utility for coloring organic derivatives of cellulose but may be employed for coloring cotton, natural silk or wool by customary methods of application.

Referring more particularly to the nuclear non-sulfonated aryl compounds of our invention, we have found that when X is oxygen, compounds having improved light fastness on organic derivatives of cellulose are obtained when the aryl nucleus contains a substituted or unsubstituted alkoxy or aryloxy group in the ortho position to the azo linkage. When X is sulfur, we have found that compounds having markedly increased light fastness on organic derivatives of cellulose, particularly cellulose acetate silk, are obtained when there is a nitro group on the aryl nucleus in ortho position to the azo linkage. Further, we have found that when R and $R_1$ are alkyl groups, the affinity of the compounds for organic derivatives of cellulose is improved if R and $R_1$ are different alkyl groups.

The following examples illustrate the preparation of the compounds of our invention:

Example 1

9.3 grams of aniline are dissolved in 50 cc. of water containing 25 cc. of 36% hydrochloric acid. The resulting solution is cooled to a temperature approximating 0–5° C. by the addition of ice, for example, and diazotized by adding, with stirring, 6.9 grams of sodium nitrite dissolved in water.

14.2 grams of 1-methyl barbituric acid are dissolved in 100 cc. of water containing 10 grams of sodium hydroxide. The resulting solution is iced and the diazo solution prepared above is added with stirring. When coupling is complete the mixture is made acid to litmus with acetic acid or a mineral acid such as hydrochloric acid and the desired azo compound is recovered by filtration, washed with water, and dried.

The corresponding thiobarbituric acid compound may be obtained by the substitution of 15.8 grams of 1-methyl thiobarbituric acid for the 1-methyl barbituric acid of the example.

Example 2

12.1 grams of o-anisidine are dissolved in water containing a suitable acid such as hydrochloric acid and diazotized in the usual manner by the addition of 6.9 grams of sodium nitrite dissolved in water.

15.6 grams of 1,3-dimethyl barbituric acid are dissolved in 200 cc. of water containing 21 grams of sodium carbonate. The resulting solution is cooled and the diazo solution prepared above is added, with stirring. Upon completion of the coupling reaction the mixture is made acid to litmus with hydrochloric acid and the dye compound formed is recovered by filtration, washed with water, and dried.

If 17.2 grams of 1,3-dimethyl thiobarbituric acid are substituted for the 1,3-dimethyl barbituric acid of the example, the corresponding thiobarbituric acid derivative will be obtained.

Example 3

13.7 grams of o-phenetidine are dissolved in 200 cc. of water containing about 36 grams of 36% hydrochloric acid. The resulting solution is cooled to a temperature approximating 0–5° C. and diazotized by the addition, with stirring, of 6.9 grams of sodium nitrite dissolved in water.

17 grams of 1-methyl-3-ethyl barbituric acid are dissolved in 150 cc. of water containing 10 grams of sodium hydroxide. The solution thus formed is cooled and the diazo solution prepared above is added, with stirring. When coupling is complete the mixture is made acid to litmus with hydrochloric acid and the dye compound formed is removed by filtration and subjected to the usual washing and drying operations.

By the substitution of 18.6 grams of 1-methyl-3-ethyl thiobarbituric acid for the 1-methyl-3-ethyl barbituric acid of the example the corresponding thiobarbituric acid compound may be prepared.

Example 4

15.3 grams of β-hydroxy-o-phenetidine are diazotized in the usual manner and coupled with 20.4 grams of 1-phenyl barbituric acid dissolved in 200 cc. of water containing 21 grams of sodium carbonate. Coupling and recovery of the desired azo compound may be carried out as previously described.

The corresponding thiobarbituric acid derivative may be obtained by the substitution of 22 grams of 1-phenyl thiobarbituric acid for the 1-phenyl barbituric acid of the example.

Example 5

16.7 grams of β-methoxy-o-phenetidine are diazotized in the usual manner and coupled with 27.8 grams of 1-p-methoxy-phenyl-3-β-hydroxyethyl barbituric acid dissolved in 250 cc. of water containing 10 grams of sodium hydroxide. Coupling and recovery of the dye compound formed may be carried out as previously described.

By the substitution of 29.4 grams of 1-p-methoxy-phenyl-3-β-hydroxyethyl thiobarbituric acid for 1-p-methoxy-phenyl-3-β-hydroxyethyl barbituric acid of the example the corresponding thiobarbituric acid derivative may be prepared.

Example 6

16.5 grams of 3-methoxy-4-aminophenylmethylketone are diazotized in the usual manner.

22.5 grams of 1-benzyl barbituric acid are dissolved in a dilute aqueous solution of sodium hydroxide. The resulting solution is cooled and the diazo solution prepared above is added, with stirring. When coupling is complete the mixture is made acid to litmus with acetic or hydrochloric acid, for example, and the desired azo compound is recovered by filtration, washed with water, and dried.

The corresponding thiobarbituric acid compound may be prepared by substituting 24.1 grams of 1-benzyl thiobarbituric acid for the 1-benzyl barbituric acid of the example.

Example 7

13.8 grams of o-nitroaniline are added to 200 cc. of water containing 40 cc. of 36% hydrochloric acid. The resulting mixture is cooled and the amine is diazotized by the addition of 6.9 grams of sodium nitrite dissolved in water.

17.2 grams of 1-ethyl thiobarbituric acid are dissolved in 200 cc. of water containing 22 grams of sodium hydroxide. The resulting solution is iced and the diazo solution prepared above is slowly added, with stirring. When coupling is complete the mixture is made acid to litmus with hydrochloric acid and the dye compound formed is removed by filtration, washed with water, and dried.

By the substitution of 15.6 grams of 1-ethyl barbituric acid for the 1-ethyl thiobarbituric acid of the example the corresponding barbituric acid derivative may be prepared.

Example 8

17.3 grams of o-nitro-p-chloroaniline are diazotized in accordance with the method described in Example 7.

17.2 grams of 1,3-dimethyl thiobarbituric acid are dissolved in an aqueous sodium carbonate solution. The resulting solution is cooled and the aqueous solution prepared above is slowly added, with stirring. Upon completion of the coupling reaction the mixture is made acid to litmus with hydrochloric acid and the desired azo compound is recovered by filtration, washed with water, and dried.

The corresponding barbituric acid derivative may be prepared by substituting 1,3-dimethyl barbituric acid for the 1,3-dimethyl thiobarbituric acid of the example.

Example 9

15.4 grams of o-nitro-p-methylaniline are diazotized according to the method described in Example 7.

26.2 grams of 1-benzyl-3-β-hydroxyethyl thiobarbituric acid are dissolved in a dilute aqueous sodium hydroxide solution. The solution formed is cooled and the diazo solution prepared above is slowly added, with stirring. Upon completion of the coupling reaction the mixture is made acid to litmus with hydrochloric acid and the precipitated dye compound is removed by filtration, washed with water, and dried.

The corresponding barbituric acid compound may be prepared by substituting 24.6 grams of 1-benzyl-3-β-hydroxyethyl barbituric acid for the 1-benzyl-3-β-hydroxyethyl thiobarbituric acid of the example.

Example 10

29.5 grams of

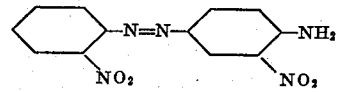

are diazotized according to the method described in Example 7 and coupled with 18.6 grams of 1-methyl-3-ethyl thiobarbituric acid dissolved in 200 cc. of water containing 40 grams of sodium carbonate. Coupling and recovery of the dye compound may be carried out as previously described.

Example 11

(A) 7.6 grams of sodium nitrite are dissolved in 53 cc. of concentrated sulphuric acid (sp. gr. 1.83). After the addition the solution is warmed to a temperature not exceeding 70° C. and then cooled to 10–15° C.

(B) 18.3 grams of 2,4-dinitroaniline are dissolved in 225 cc. of hot glacial acetic acid and then cooled rapidly to room temperature.

Solution A is stirred and mixture B is added thereto over a period of one hour while maintaining a temperature of 10–15° C. After the addition the resulting solution is stirred for 30 minutes, 1 gram of urea being added to remove any excess nitrous acid.

23.2 grams of 1,3-di-β-hydroxyethyl thiobarbituric acid are dissolved in an aqueous solution of sodium hydroxide containing a large excess of the alkali. The resulting solution is cooled and the diazo solution prepared as described above is slowly added, with stirring. Coupling and recovery of the reaction product may be carried out as described in the previous examples.

In order that our invention may be fully understood, the preparation of a number of substances used in the manufacture of the compounds of our invention is disclosed hereinafter.

1-methyl barbituric acid

This compound may be prepared as described in Berichte der Deutschen Chemischen Gesellschaft, volume 54, page 1037 (1921).

By substitution of other alkyl ureas for methyl urea other alkyl barbituric acids can be prepared in accordance with the method described for the preparation of 1-methyl barbituric acid.

1-ethyl barbituric acid

This compound may be prepared as described in Berichte der Deutschen Chemischen Gesellschaft, volume 54, page 1038 (1921).

1,3-diethyl barbituric acid

This compound may be prepared as described in Berichte der Deutschen Chemischen Gesellschaft, volume 54, pages 1038–9 (1921).

1-methyl-3-ethyl-barbituric acid 102 grams of methyl ethyl urea are dissolved in 500 cc. of absolute ethanol and added to a solution of 23 gm. of sodium in 500 cc. of boiling absolute ethanol containing 160 grams of ethyl malonate. The resulting mixture is refluxed for 7–10 hours and hydrochloric acid (sp. gr. 1.18) is then added until the mixture is slightly acid to Congo red paper. 1000 cc. of water are added. On standing, 1-methyl-3-ethyl barbituric acid crystallizes out.

1-β-hydroxyethyl barbituric acid 110 grams of β-hydroxyethyl urea are dissolved in 500 cc. of absolute ethanol and added to a solution of 23 grams of sodium in 500 cc. of absolute ethanol containing 160 grams of ethyl malonate. Twice as much sodium as described may be employed. The resulting mixture is refluxed for 7–10 hours and worked up in the manner described for 1-methyl-3-ethyl barbituric acid.

1-methyl-β-hydroxyethyl barbituric acid and 1,3-di-β-hydroxyethyl barbituric acid may be prepared in an exactly similar manner by the substitution of

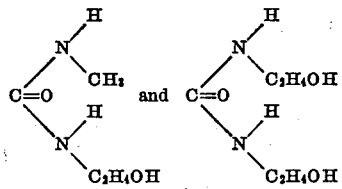

respectively, for the β-hydroxyethyl barbituric acid of the example.

1-phenyl barbituric acid

This compound may be prepared as described on pages 1252 and 1253 of the Journal of the Chemical Society for 1926.

1-benzyl barbituric acid 138 grams of benzyl urea in 500 cc. of absolute ethanol are added to a boiling solution of 23 grams of sodium in 500 cc. of absolute ethanol containing 160 grams of ethyl malonate. The mixture is refluxed for 7–10 hours and hydrochloric acid is then added until the mixture is acid to Congo red paper. 1000 cc. of water are added to the acid mixture. On standing, 1-benzyl barbituric acid separates.

By the substitution of

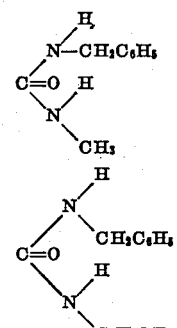

and

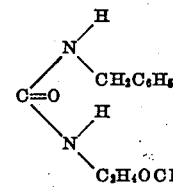

for benzyl urea, 1-benzyl-3-methyl barbituric acid, 1-benzyl-3-β-hydroxyethyl barbituric acid and 1-benzyl-3-β-methoxyethyl barbituric acid, respectively, may be prepared in a similar manner.

While the examples immediately preceding deal with barbituric acid derivatives it will be understood that the corresponding thiobarbituric acid derivatives can be prepared in like fashion by the substitution of the thioureas corresponding to the urea compounds employed in the examples.

The following tabulations further illustrate the compounds included with the scope of our invention, together with the color they produce on cellulose acetate silk. The compounds indicated below may be prepared by diazotizing the amines listed under the heading "Amine" and coupling with the compounds specified in the column entitled "Coupling Component." The diazotization and coupling reactions may be carried out in accordance with the general procedure disclosed in Examples 1–11, inclusive.

Tabulation A—Substituted barbituric acid derivatives

| Amine | Coupling component | Color on cellulose acetate silk |
|---|---|---|
| Aniline | (1) 1-methyl barbituric acid | Greenish-yellow. |
| Do | (2) 1,3-dimethyl barbituric acid | Do. |
| Do | (3) 1-methyl-3-ethyl barbituric acid | Do. |
| Do | (4) 1-methyl-3-propyl barbituric acid | Do. |
| Do | (5) 1-methyl-3-phenyl barbituric acid | Do. |
| Do | (6) 1-methyl-3-benzyl barbituric acid | Do. |
| Do | (7) 1-p-methoxyphenyl barbituric acid | Do. |
| Do | (8) 1-benzyl barbituric acid | Do. |
| Do | (9) 1,3-diphenyl barbituric acid | Do. |
| Do | (10) 1,3-di-β-hydroxyethyl barbituric acid | Do. |
| o-Phenetidine | 1–10 above | Do. |
| m-Phenetidine | do | Do. |
| p-Phenetidine | do | Do. |
| o-Anisidine | do | Do. |
| m-Anisidine | do | Do. |
| p-Anisidine | do | Do. |
| o-Toluidine | do | Do. |
| m-Toluidine | do | Do. |
| p-Toluidine | do | Do. |
| o-Bromoaniline | do | Do. |
| m-Bromoaniline | do | Do. |
| p-Bromoaniline | do | Do. |
| o-Chloroaniline | do | Do. |
| m-Chloroaniline | do | Do. |
| p-Chloroaniline | do | Do. |
| o-Fluoroaniline | do | Do. |
| m-Fluoroaniline | do | Do. |
| p-Fluoroaniline | do | Do. |
| o-Iodoaniline | do | Do. |
| m-Iodoaniline | do | Do. |
| p-Iodoaniline | do | Do. |
| o-ω-Hydroxyethoxyaniline | do | Do. |
| m-ω-Hydroxyethoxyaniline | do | Do. |
| p-ω-Hydroxyethoxyaniline | do | Do. |
| o-Phenoxyaniline | do | Do. |
| m-Phenoxyaniline | do | Do. |
| p-Phenoxyaniline | do | Do. |
| 1-amino-2-methoxy-4,5-dihalobenzene | do | Do. |
| 1-amino-2-ethoxy-4,5-dihalobenzene | do | Do. |
| 1-amino-4-methoxy-5-dihalobenzene | do | Do. |
| 1-amino-4-ethoxy-5-dihalobenzene | do | Do. |
| o-methoxy-p-methylaniline | do | Do. |
| o-Methoxy-p-ethylaniline | do | Do. |
| o-Ethoxy-p-methylaniline | do | Do. |
| o-Ethoxy-p-ethylaniline | do | Do. |
| o-Methyl-p-methoxyaniline | do | Do. |
| o-Methyl-p-ethoxyaniline | do | Do. |
| o-Ethyl-p-methoxyaniline | do | Do. |
| o-Ethyl-p-ethoxyaniline | do | Do. |
| 1-amino-2,4-dihalobenzene | do | Do. |
| 1-amino-2,5-dihalobenzene | do | Do. |
| o-Methyl-p-ethylaniline | do | Do. |
| o-Ethyl-p-methylaniline | do | Do. |
| 1-amino-2,4-dimethylbenzene | do | Do. |
| 1-amino-2,4-diethylbenzene | do | Do. |
| o-Nitroaniline | do | Do. |
| m-Nitroaniline | do | Do. |
| p-Nitroaniline | do | Do. |
| o-Nitro-p-haloaniline | do | Do. |
| o-Nitro-p-methoxyaniline | do | Do. |
| o-Nitro-p-ethoxyaniline | do | Do. |
| o-Methoxy-p-nitroaniline | do | Do. |
| o-Ethoxy-p-nitroaniline | do | Do. |
| o-Methyl-p-nitroaniline | do | Do. |
| o-Ethyl-p-nitroaniline | do | Do. |
| p-Aminoacetophenone | do | Do. |
| 3-methoxy-4-aminophenylmethylketone | do | Do. |
| 3-ethoxy-4-aminophenylmethylketone | do | Do. |
| 3-halo-4-aminophenylmethylketone | do | Do. |
| 3-nitro-4-aminophenylmethylketone | do | Do. |
| 1-amino-2,4-dinitrobenzene | do | Do. |
| a-Naphthylamine | do | Do. |
| p-Aminodiethylanidine | do | Red. |
| p-Phenylene diamine | do | Orange-red. |
| Phenyl ring with CH$_2$OCH$_2$CH$_3$ and NH$_2$ substituents | do | Greenish-yellow. |
| Phenyl ring with CH$_2$OCH$_3$ and NH$_2$ substituents | do | Do. |
| Phenyl ring with C$_2$H$_4$OCH$_3$ and NH$_2$ substituents | do | Do. |
| Phenyl ring with OC$_2$H$_4$OC$_2$H$_5$ and NH$_2$ substituents | do | Do. |
| Phenyl ring with C$_2$H$_4$OC$_2$H$_5$ and NH$_2$ substituents | do | Do. |

Tabulation B—Substituted thiobarbituric acid derivatives

| Amine | Coupling component | *Color on cellulose acetate silk |
|---|---|---|
| Same amines as under Tabulation A—substituted barbituric acid compounds. | (1) 1-methyl thiobarbituric acid<br>(2) 1,3-dimethyl thiobarbituric acid<br>(3) 1-methyl-3-ethyl thiobarbituric acid.<br>(4) 1-methyl-3-propyl thiobarbituric acid.<br>(5) 1-methyl-3-phenyl thiobarbituric acid.<br>(6) 1-methyl-3-benzyl thiobarbituric acid.<br>(7) 1-p-methoxphenyl thiobarbituric acid.<br>(8) 1-benzyl thiobarbituric acid<br>(9) 1,3-diphenyl thiobarbituric acid<br>(10) 1,3-di-β-hydroxyethyl thiobarbituric acid. | Greenish-orange-yellow.<br>Do.<br>Do.<br>Do.<br>Do.<br>Do.<br>Do.<br>Do.<br>Do.<br>Do. |

* Where the amine employed is p-aminodiethylaniline and p-phenylene diamine the colors produced on cellulose acetate silk are red and orange red, respectively.

In the above tabulations reference has been made to halogen substituted amines such as 1-amino-2-methoxy-4, 5-dihalobenzene and 1-amino-2,4-dihalobenzene, for example. These amines may have the same or different halogen atoms.

In employing the aromatic azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80-85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45-55° C., for example, following which the temperature of the dye bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling component such as 1-methylbarbituric acid, 1,3-dimethylbarbituric acid, 1-methyl-3-ethyl barbituric acid, 1-phenylbarbituric acid or 1-ethylbarbituric acid, for example. Conversely the material undergoing dyeing or coloration may first be treated to absorb one of said acid coupling components and the dye subsequently formed in situ by coupling with an aryl diazonium salt.

The following examples illustrate how dyeing may be carried out in accordance with our invention. Quantities are expressed in parts by weight.

Example A 2.5 parts of

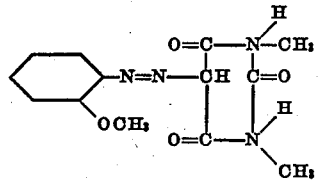

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a greenish-yellow shade of excellent fastness to light.

EXAMPLE B 2.5 parts of

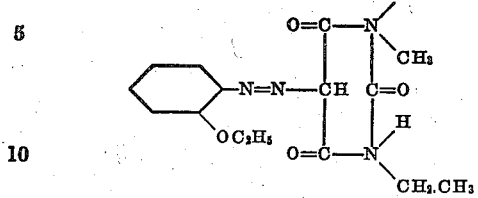

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a greenish-yellow shade of excellent fastness to light.

EXAMPLE C

By the substitution of 2.5 parts of

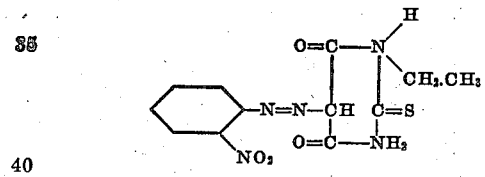

for the dye compounds of Examples A and B cellulose acetate silk can be dyed a greenish-yellow shade of excellent fastness to light in an exactly similar manner as described in said examples.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. A process of coloring an organic derivative of cellulose which comprises applying thereto a dye selected from the class of nuclear non-sulfonated azo compounds having the general formula:

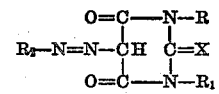

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus.

2. A process of coloring an organic acid ester of cellulose which comprises applying thereto a dye selected from the class of nuclear non-sulfonated azo compounds having the general formula:

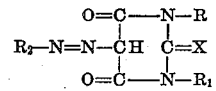

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus.

3. A process of coloring a cellulose acetate which comprises applying thereto a dye selected from the class of nuclear non-sulfonated azo compounds having the general formula:

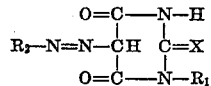

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus.

4. A process of coloring a cellulose acetate which comprises applying thereto a dye selected from the class of nuclear non-sulfonated azo compounds having the general formula:

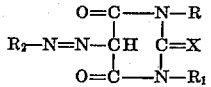

wherein X represents oxygen or sulfur, $R_1$ represents an alkyl, an alkaryl or an aryl group and $R_2$ represents an aryl nucleus of the benzene series.

5. A process of coloring a cellulose acetate which comprises applying thereto a dye selected from the class of nuclear non-sulfonated azo compounds having the general formula:

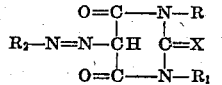

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus of the benzene series having an alkoxy or aryloxy group in the ortho position to the azo group when X is oxygen and a nitro group in said ortho position when X is sulfur.

6. Material made of or containing an organic derivative of cellulose colored with a dye selected from the class of nuclear non-sulfonated azo compounds having the general formula:

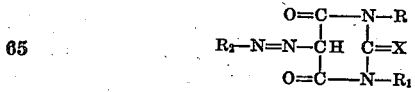

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus.

7. Material made of or containing an organic acid ester of cellulose colored with a dye selected from the class of nuclear non-sulfonated azo compounds having the general formula:

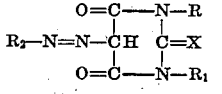

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus.

8. A cellulose acetate colored with a dye selected from the class of nuclear non-sulfonated azo compounds having the general formula:

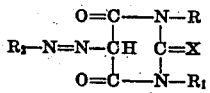

wherein X represents oxygen or sulfur, R represents hydrogen, an alkyl group, an alkaryl group or an aryl goup, $R_1$ represents an alkyl, an alkaryl or an aryl group and $R_2$ represents an aryl nucleus.

9. A cellulose acetate colored with a dye selected from the class of nuclear non-sulfonated azo compounds having the general formula:

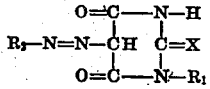

wherein X represents oxygen or sulfur, $R_1$ represents an alkyl, an alkaryl or an aryl group and $R_2$ represents an aryl nucleus of the benzene series.

10. A cellulose acetate colored with a dye selected from the class of nuclear non-sulfonated azo compounds having the general formula:

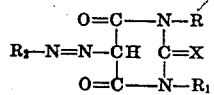

wherein X represents oxygen or sulfur, R represents hydrogen, an alkyl group, an alkaryl group or an aryl group, $R_1$ represents an alkyl, an alkaryl or an aryl group and $R_2$ represents an aryl nucleus of the benzene series having an alkoxy or aryloxy group in the ortho position to the azo group when X is oxygen and a nitro group in said ortho position when X is sulfur.

11. A nuclear non-sulfonated azo compound having the general formula:

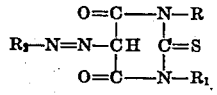

wherein R represents hydrogen, an alkyl group, an alkaryl group, or an aryl group, $R_1$ represents an alkyl, an alkaryl or an aryl group and $R_2$ represents an aryl nucleus.

JAMES G. McNALLY.
JOSEPH B. DICKEY.